Lieb & Crane.
Umbrella.
No. 3726
Reissued. Nov. 9. 1869.
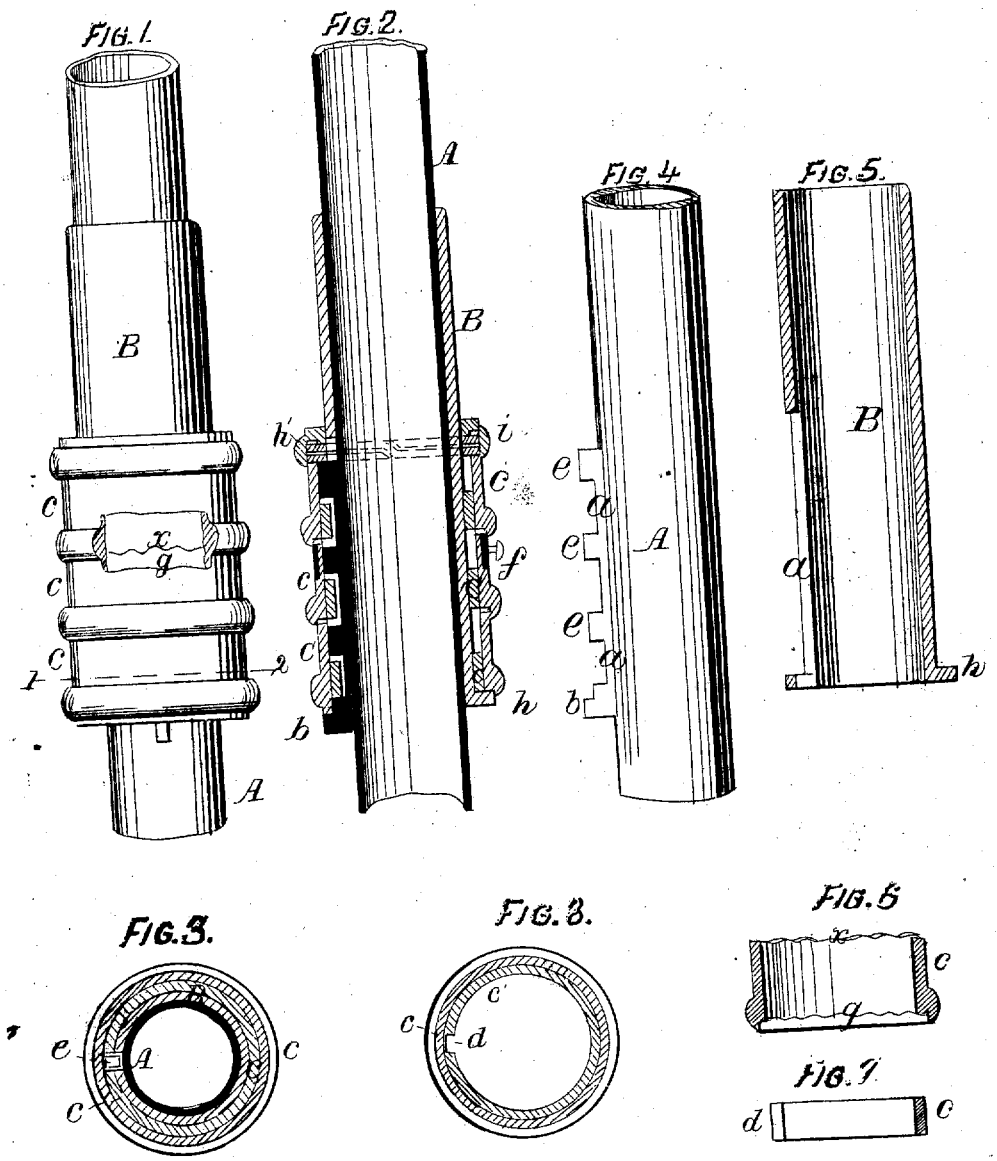
WITNESSES { Wm. A. Stuart, Harry Smith
E. Wright, Jno. Wright, J. Wright, J. Noble and J. N. Wilson by their Attys. Howson & Howson

United States Patent Office.

EDMUND WRIGHT, JOHN WRIGHT, JOSEPH WRIGHT, AND JOHN NOBLE, OF PHILADELPHIA, PENNSYLVANIA, AND JACOB H. FILSON, OF NEW YORK, N. Y., ASSIGNEES OF JOHN A. LIEB AND E. W. CRANE.

*Letters Patent No.* 74,555, *dated February* 18, 1868; *reissue No.* 3,726, *dated November* 9, 1869.

IMPROVEMENT IN SAFETY-ATTACHMENTS FOR UMBRELLAS.

The Schedule referred to in these Letters Patent and making part of the same.

We, EDMUND WRIGHT, JOHN WRIGHT, JOSEPH WRIGHT, and JOHN NOBLE, all of Philadelphia, Pennsylvania, and JACOB H. FILSON, of New York, N. Y., are the sole owners of the patent, No. 74,555, (granted, February 18, 1868, to JOHN A. LIEB and E. W. CRANE, of Newark, New Jersey,) for an Improvement in Umbrellas, of which the following is an amended specification.

*Nature and Objects of the Invention.*

The invention of the said LIEB and CRANE consists in the combination, with the runner and stick of an umbrella, of a permutation locking-device, or equivalent mechanism; whereby the control of the runner, and, consequently, of the opening of the umbrella, is made dependent upon the proper adjustment of the movable parts of the device; and such proper adjustment is determined by letters or other characters on the said movable parts, as explained hereafter.

The invention further consists of a peculiar detailed construction, described hereafter, of a locking-device.

The object of this invention is to prevent the purloining of umbrellas, by rendering them of no avail to those who are unacquainted with the proper adjustment of the movable parts of the locking-device.

*Description of the Accompanying Drawing.*

Figure 1 is an exterior view, partly in section, of sufficient of an umbrella to illustrate the invention;

Figure 2, a vertical section of fig. 1;

Figure 3, a sectional plan on the line 1–2, fig. 1;

Figure 4, an exterior view of part of the "stick" of the umbrella;

Figure 5, a sectional elevation of the runner or slide;

Figures 6 and 7, detached sectional views of the ring and flange of the locking-device detached from each other; and Figure 8, a sectional plan of one of the rings.

All the views are drawn to an enlarged scale.

*General Description.*

A represents a portion of the stick of an umbrella; and on this stick the runner B is arranged to slide, in the usual manner, a rib or feather, *a*, fig. 4, on the stick projecting through a slot, *a'*, fig. 5, in the runner, and thereby preventing the latter from turning independently of the stick, and a stop, *b*, on the latter limiting the movement of the runner in the direction of the handle.

It should be understood that the invention is applicable to runners of any desired character, and is not limited to those of the precise construction shown in the drawing.

Two or more rings (three being shown in the present instance) are fitted so as to turn freely on the runner to which they are confined—above by the stationary ring *i*, and below by a flange, *h*, or its equivalent; and at the inside of each ring is a circular flange, *c'*, in one side of which is a notch, *d*, the flange occupying a position near the lower edge of the ring, so that the latter can be turned on the runner without being interfered with by the adjacent stop or projection *e* on the rib *a* of the stick, there being one of these stops for each ring, as shown in fig. 2.

When the rings are so adjusted that their notches *d* all coincide with each other, and with the rib *a* and its projections *e*, the runner may be moved freely on the stick, and the umbrella opened; but, if one or more rings are turned so that their notches *d* do not coincide with the projections *e*, their flanges *c'*, extending beneath these projections, fig. 2, will lock the runner in its position on the stick, and prevent the opening of the umbrella.

On the surfaces of the rings are letters or characters, so arranged, in respect to the notches *d*, that when three predetermined letters or other characters are in a line with each other, and with the stop *d*, or with a mark on the stationary ring *i* or flange *h*, the notches of all the rings will coincide with each other, and with the projections *e*, which the rings can then pass, so as to permit the runner to slide upward, and the umbrella to be opened.

It will thus be seen, therefore, that those only who are familiar with the proper adjustment of the rings, as designated by given letters or other characters, can open the umbrella.

The intermediate ring (or rings) has its upper and lower edges, *x g*, fig. 6, scalloped, and adapted to the scalloped edges of the rings above and below it, the upper edge of the lower ring and the lower edge of the upper ring being scalloped.

Between the stationary ring *i* and the uppermost of the movable rings intervenes a spring, *h'*, which, owing to the scalloped edges above mentioned, yields when the rings are turned, (except when all are turned together,) and tends to maintain the projecting portions of the scalloped edges of one ring in the depressions of the other, so that the rings are retained in their relative positions, a slight effort (determined by the strength of the spring) being required to move one ring independently of the others.

At the lower edge of each ring is an enlargement, which is milled at the edge, so that the ring may be grasped and turned with facility.

Each flange *c'* may consist of a strip of metal, bent to an annular form, and soldered to the inside of the ring; or it may be so fitted to the ring as to maintain its position by its elasticity, the strip being of such a length that its ends are not in contact, thus leaving a space, (or notch, *d*,) which permits the ring to pass the projections *e*.

The flanges, if thus made, can be turned or adjusted within the rings so that the notch *d* may be brought opposite any character on the outer side of the ring. The arrangement of letters necessary to bring the notches in a line with each other, and to permit the opening of the umbrella, may thus be altered at pleasure, or when the previous adjustment has been known to others who can control the opening of the umbrella as well as the owner.

Instead of making these flanges movable within the rings, the latter may have exterior graduated and adjustable jackets, *f*, fig. 2, each provided with a button, by which it may be turned, to bring one or other of the characters opposite the notch *d* within the ring.

We do not desire to confine ourselves to the precise construction or arrangement of parts described, as they may be altered and modified without departing from the main features of the invention of the said LIEB and CRANE.

*Claims.*

1. The combination, with the runner and stick of an umbrella, of a permutation locking-device, or equivalent mechanism, whereby the control of the runner is made dependent upon the proper adjustment of movable parts of the locking-mechanism, and such proper adjustment is determined by letters or other characters on the said movable parts.

2. The combination of the stick, with its projections *e e*, slotted runner B, and rings *c*, with the notched flanges.

3. The scalloped edges of the rings, in combination with the spring *h'*, or its equivalent.

In testimony whereof, we have signed our names to this specification, in the presence of subscribing witnesses.

EDMD. WRIGHT.
JOHN WRIGHT.
JOSEPH WRIGHT.
JOHN NOBLE.

Witnesses:
LOUIS J. CLARK,
JOS. C. DANDO.

JACOB H. FILSON.

Witnesses:
H. HOWSON,
WM. H. PAULSEN.